US006727493B2

(12) United States Patent
Franklin et al.

(10) Patent No.: US 6,727,493 B2
(45) Date of Patent: Apr. 27, 2004

(54) MULTIPLE RESOLUTION PHOTODIODE SENSOR ARRAY FOR AN OPTICAL ENCODER

(75) Inventors: Ruth E. Franklin, Santa Barbara, CA (US); Richard Mathew Forsyth, Graz (AT)

(73) Assignee: Renco Incoders, Inc., Goleta, CA (US)

( * ) Notice: Subject to any disclaimer, the term of this patent is extended or adjusted under 35 U.S.C. 154(b) by 45 days.

(21) Appl. No.: 09/992,542

(22) Filed: Nov. 6, 2001

(65) Prior Publication Data

US 2003/0085345 A1 May 8, 2003

(51) Int. Cl.[7] .................................. G01D 5/34
(52) U.S. Cl. ...................... 250/231.13; 250/231.18
(58) Field of Search ................ 250/231.13, 231.14, 250/231.16, 231.18, 201.1; 341/11, 13; 356/616–619

(56) References Cited

U.S. PATENT DOCUMENTS

| 5,252,825 A | * 10/1993 | Imai et al. ............ 250/231.18 |
| 5,920,494 A | 7/1999 | Setbacken et al. |
| 5,936,236 A | 8/1999 | Setbacken et al. |
| 6,175,109 B1 | 1/2001 | Setbacken et al. |

FOREIGN PATENT DOCUMENTS

EP 0 710 819 5/1996

OTHER PUBLICATIONS

U.S. patent application Ser. No. 10/443,483, Johnson, filed May 22, 2003.

* cited by examiner

Primary Examiner—Que T. Le
(74) Attorney, Agent, or Firm—Brinks Hofer Gilson & Lione

(57) ABSTRACT

A method of controlling the resolution of an optical encoder for providing position information of an object which moves along a certain measuring direction where the optical encoder includes a light source that emits light and a data track that moves relative to the light source. The method includes directing modulated light from the data track to a plurality of photodiodes of a detection system having a resolution that has a first value and changing the resolution of the detection system to a second value without altering an arrangement of the plurality of photodiodes of the detection system during the changing from the first value to the second value.

47 Claims, 17 Drawing Sheets

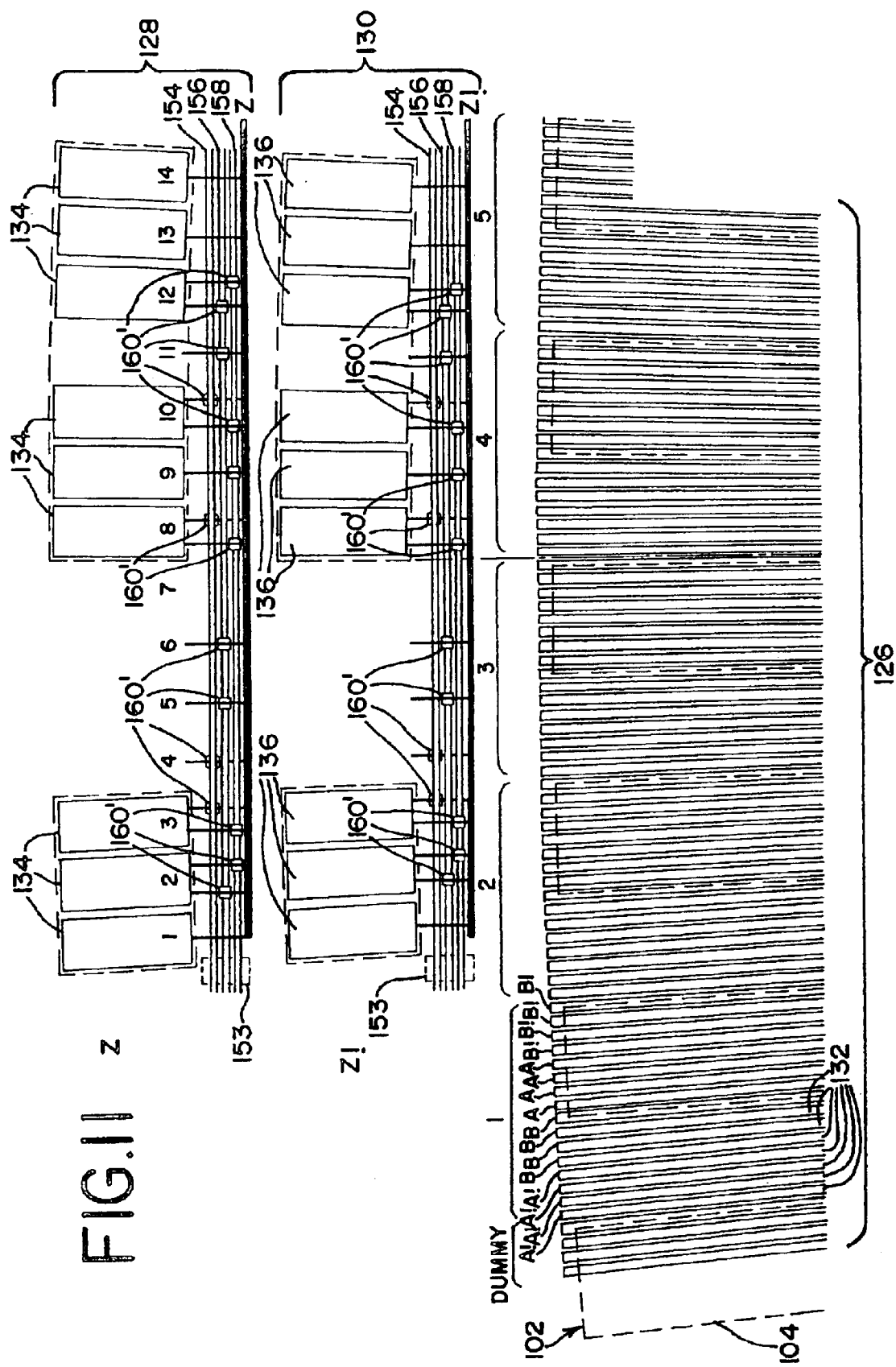

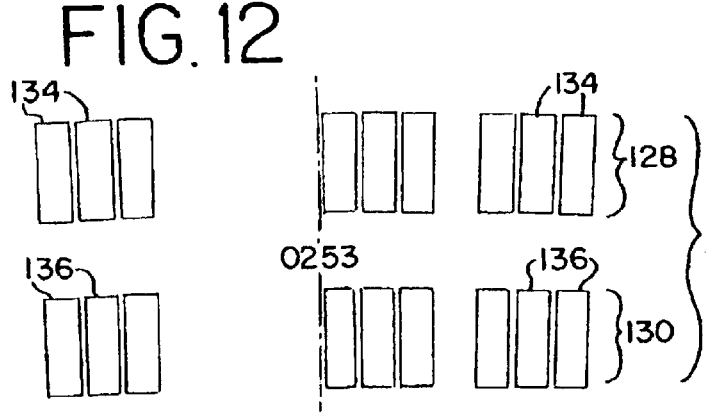
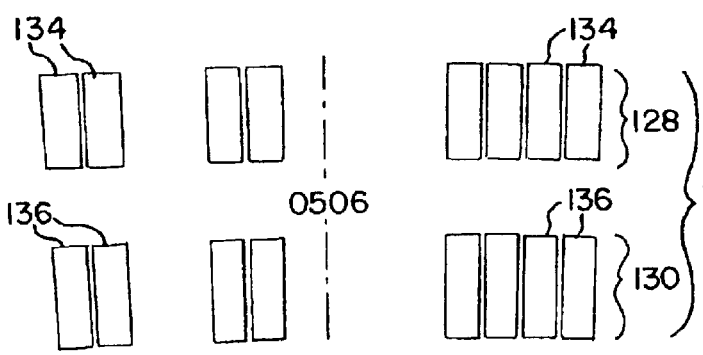
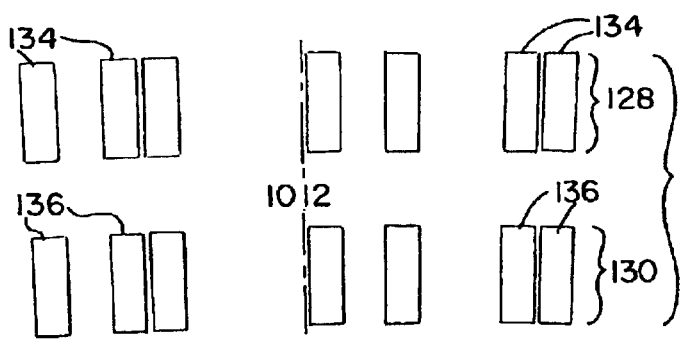
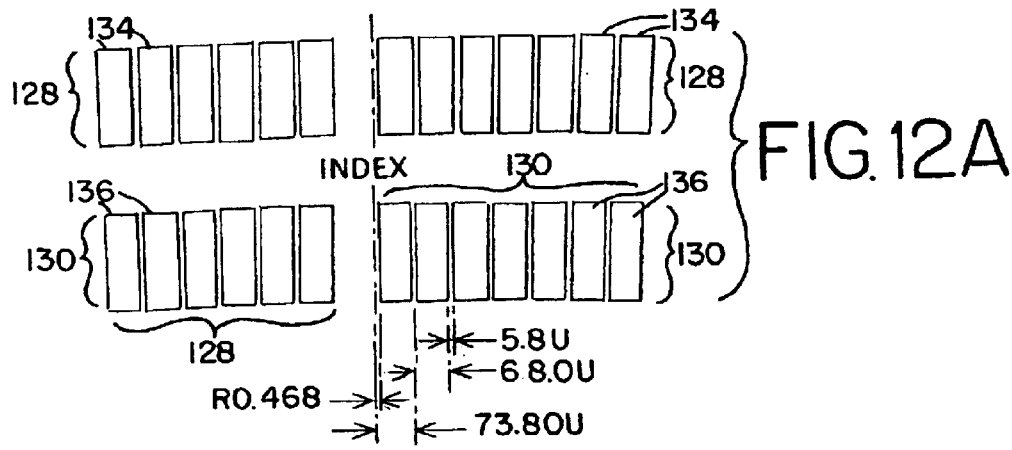

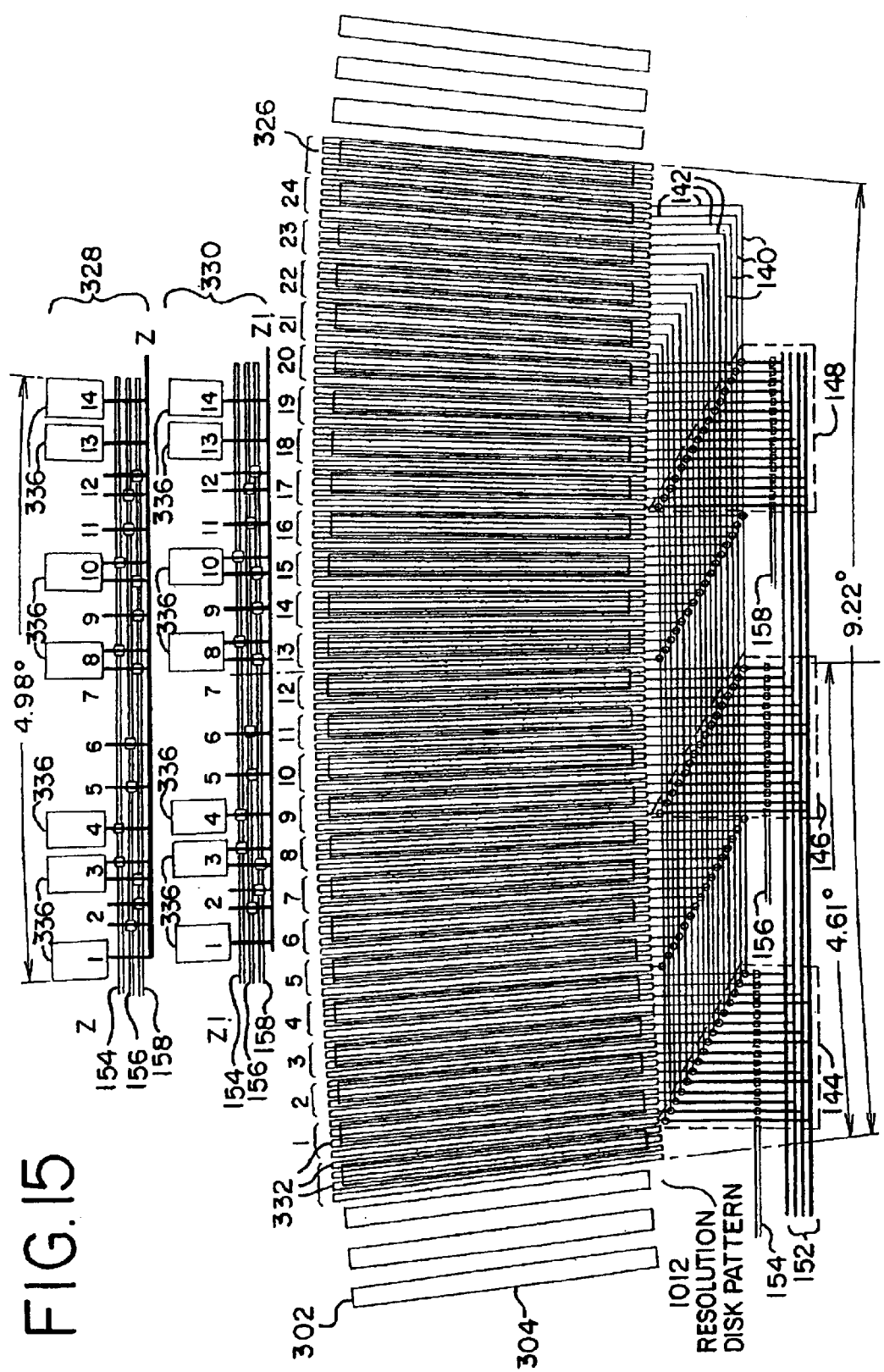

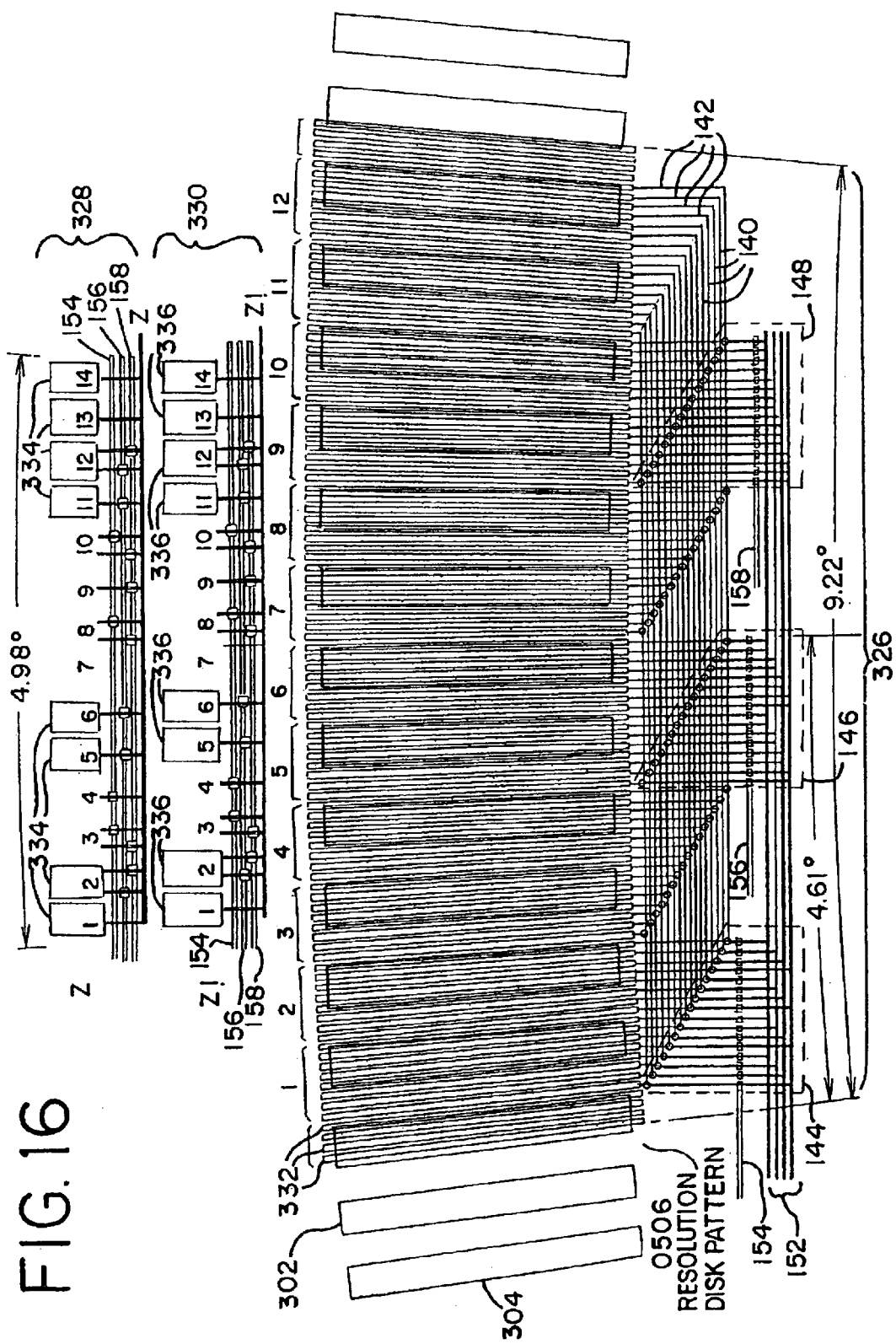

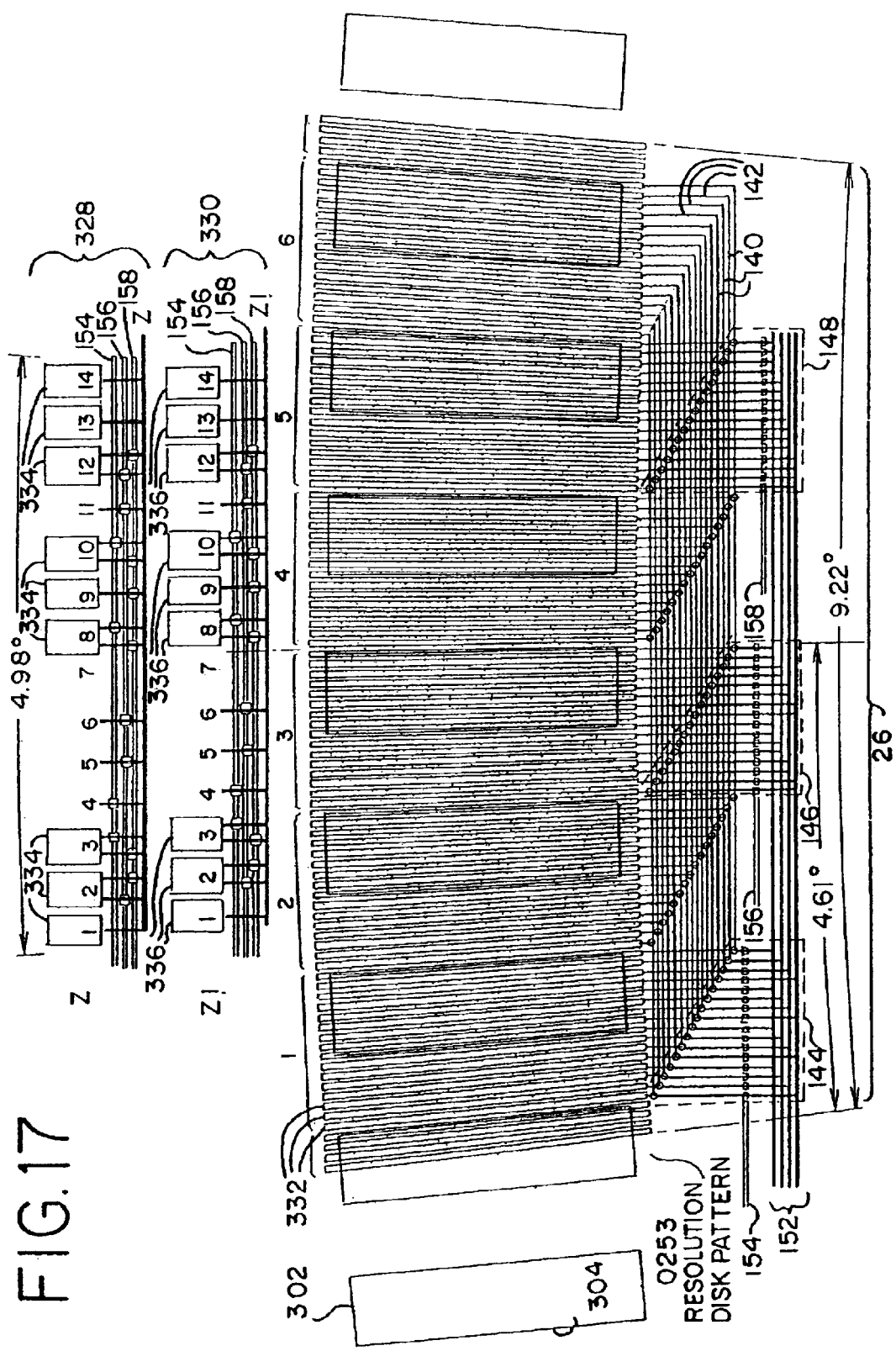

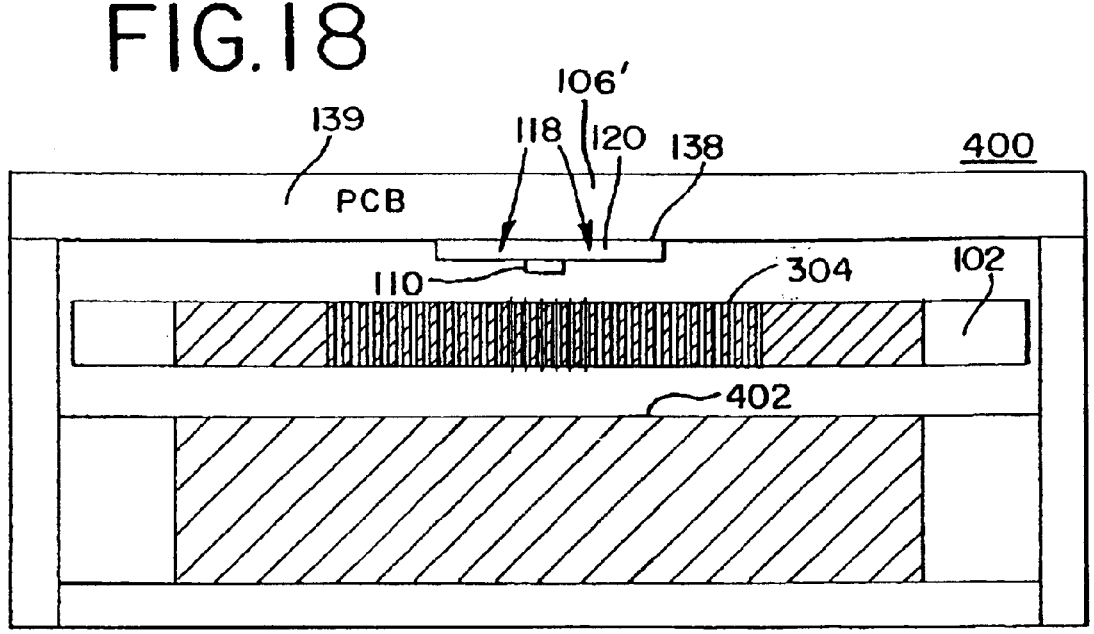

MULTIPLE RESOLUTION PHOTODIODE SENSOR ARRAY FOR AN OPTICAL ENCODER

BACKGROUND OF THE INVENTION

1. Field of the Invention

The present invention relates to photodiode sensor arrays used for a multiplicity of optical resolutions. In particular, the present invention regards photodiode sensor arrays for an optical encoder used for a multiplicity of resolutions.

2. Discussion of Related Art

Optical encoders for determining the relative position between two movable objects are well known. It is possible to determine relative positions in linear movement directions as well as in rotary movement directions. In these systems one object is usually connected with a scanning graduation while the other object is connected with a scanning unit. In the case of a linear encoder, a linear scale with a linear graduation is used whereas in the case of a rotary encoder a code disk with a circular graduation is used. The scanning unit used for either linear movement or rotary movement has one or more illumination sources and one or more optoelectronic detector elements. As detector elements e.g. photodiodes are usually used.

In the last several years, linear and rotary encoders have become more and more popular having a plurality of interdigitized photodiodes as detector elements. Sometimes such a detector arrangement is also called a phased array. Such an encoder and detector arrangement is shown in U.S. Pat. No. 6,175,109, the entire contents of which are incorporated herein by reference.

It is known that embodiments of the above-mentioned detector arrangements have photodiodes arranged in an array on a semiconductor chip. The arrangement of the photodiodes has to be tailored/designated for each encoder configuration in a unique way. This means that the required geometrical arrangement of the photodiodes, such as their width and spacing, depends on the scanning configuration, especially on the graduation period of the scanned scanning graduation. For a certain measurement resolution there exists a well-defined arrangement of photodiodes. Accordingly, if there is a need to change the scanning configuration or the resolution of the encoder, there will be a need to modify the design of the photodiode array in order to achieve the desired scanning configuration or resolution. An enormous amount of design work is necessary to modify the layout of the photodiode array in this case.

To solve the above problem, European Patent Specification EP 0 710 819 B1 suggests to use a single photodiode assembly with a plurality of photodiodes for several different scanning graduations having different graduation periods. For that purpose, only a certain number of all available photodiodes has to be activated in dependence of the scanning graduation. An adaptation procedure is necessary to determine in each case which of the photodiodes have to be activated for a certain scanning graduation. One important drawback of this system is that it requires a complex ASIC to control the adaptation procedure. Another disadvantage is that the system's activation phase would require special tooling discs should light be allowed to shine on multiple incremental data signal groups. Furthermore, a lot of space of memories and associated circuitry on the carrier substrate is necessary which is contrary to a possible miniaturization of the system.

Another disadvantage of the system disclosed in EP 0 710 819 is the system's index sensors for determining the absolute position. In particular, a disc with a pattern of openings that match the pattern of the index sensor allows light to move across the index sensors. The light completely illuminates the index sensors at only one point per rotation. During those times when the index sensors are partially illuminated, the signal is significantly smaller than when all of the index sensors are simultaneously illuminated.

Accordingly, it is an object of the present invention to easily modify the resolution of a detector array while allowing the detector array to have a desirable miniature size.

Another object of the present invention is to modify the resolution of a detector array without using an adaptation phase.

Another object of the present invention is to improve the strength of the absolute and relative position signals generated by a detector array at multiple resolutions.

SUMMARY OF THE INVENTION

One aspect of the present invention regards an optical encoder for providing position information of an object, which moves along a certain measuring direction, the encoder includes a light source that emits light and a data track attached to an object that moves relative to the light source, the data track receiving the light and comprising a plurality of alternating areas of different optical properties of a particular resolution. A detection system receives modulated light from the data track and generates a position signal from the received light. The detection system includes a photodiode array that receives the modulated light from the data track and a resolution selection unit connected to the photodiode array and which controls a resolution of the photodiode array, wherein all photodiodes associated with the photodiode array are active irrespective of a resolution selected by the resolution selection unit.

A second aspect of the present invention regards a method of controlling the resolution of an optical encoder for providing position information of an object, which moves along a certain measuring direction where the optical encoder includes a light source that emits light and a data track that moves relative to the light source. The method includes directing modulated light from the data track to a plurality of photodiodes of a detection system having a resolution that has a first value and changing the resolution of the detection system to a second value without altering an arrangement of the plurality of photodiodes of the detection system during the changing from the first value to the second value.

A third aspect of the present invention regards an optical encoder for providing position information of an object, which moves along a certain measuring direction. The encoder includes a light source that emits light, a data track attached to an object that moves relative to the light source, the data track receiving the light and having a plurality of alternating areas of different optical properties of a particular resolution. A detection system receives light from the data track and generates an index signal from the received light. The detection system includes an index photodiode array that receives the light from the data track and generates an index signal and a resolution selection unit connected to the index photodiode array and which controls contrast of the index signal.

A fourth aspect of the present invention regards a method of controlling an index signal of an optical encoder for providing position information of an object which moves along a certain measuring direction, where the optical encoder includes a light source that emits light and a data track that moves relative to the light source and has a given resolution. The method includes directing light from the data track to a plurality of photodiodes of an index photodiode array and changing the activation status of one or more of the photodiodes of the index photodiode array without altering an arrangement of the photodiodes of the index photodiode array so as to form an index signal.

Each aspect of the present invention provides the advantage of easily modifying the resolution of a detector array while allowing the detector array to have a desirable miniature size.

Each aspect of the present invention provides the advantage of not requiring an adaptation phase to determine the photodiodes to be activated in an array for a particular resolution. Elimination of the need of an activation phase provides the additional advantage that special tooling discs are not required such as would be needed for the system described in EP 0 710 819 should light be allowed to shine on multiple incremental data signal groups.

These and other features and advantages of the present invention will be appreciated as the same becomes better understood by reference to the following detailed description when considered in connection with the accompanying drawings.

BRIEF DESCRIPTION OF THE DRAWINGS

FIG. 11 schematically shows an enlarged view of index photodiodes of the encoder and photodiode array of FIG. 10;

FIG. 12A schematically shows a top view of the index arrays of FIGS. 1–11;

FIGS. 12B–D schematically show a top view of the activated photodiodes of index arrays of FIGS. 1–11 when configured for providing index signals for the resolution disk patterns of 1012, 506 and 253, respectively;

FIG. 15 schematically shows the magnetic encoder and detector array of FIG. 14 when configured for providing a resolution of 1012 and a resolution disk pattern of 1012;

FIG. 16 schematically shows the magnetic encoder and detector array of FIG. 14 when configured for providing a resolution of 506 and a resolution disk pattern of 506;

FIG. 17 schematically shows the magnetic encoder and detector array of FIG. 14 when configured for providing a resolution of 253 and a resolution disk pattern of 253; and FIG. 18 schematically shows a side view of a second embodiment of an optical encoder and detector array according to the present invention.

DETAILED DESCRIPTION OF THE PREFERRED EMBODIMENTS

Figure 1:
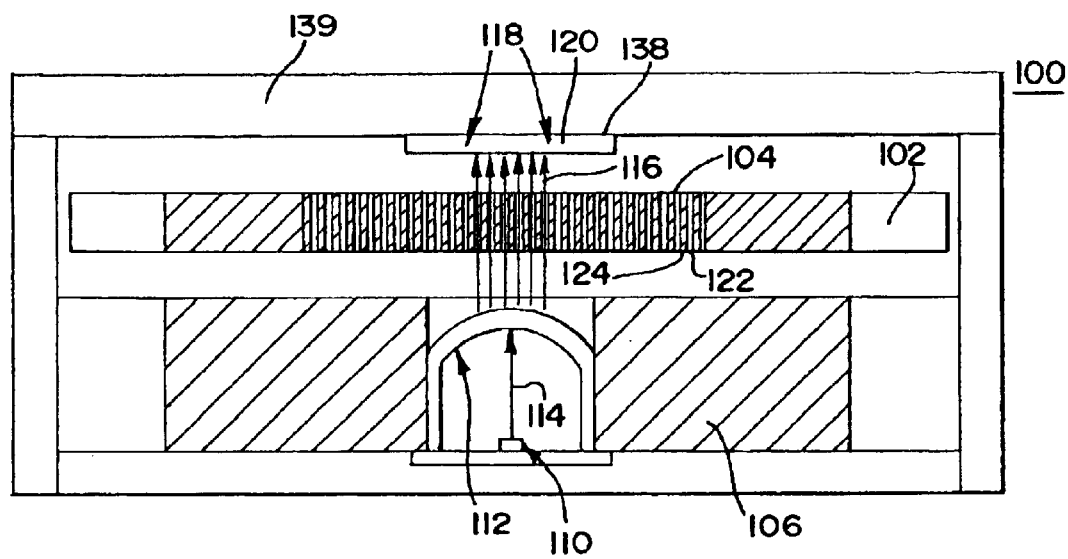
FIG. 1 schematically shows a side view of an embodiment of an encoder with a photodiode array according to the present invention.

FIG. 1 illustrates schematically a cross-section of an optical encoder according to a preferred embodiment of the present invention. In particular, the optical encoder shown is a rotary encoder 100 that generates positional information with respect to the movement of two rotating objects. The rotary encoder 100 can be used, for example, in applications together with brushless motors.

The optical encoder 100 includes a code wheel 102 with a single data track 104 as shown in FIGS. 1–3, 5, 6, 8, 9 and 11, the code wheel 102 being mounted on a shaft (not shown) which rotates around an axis and moves/rotates along a measuring direction. The rotating shaft can be the rotor of a brushless DC motor, for example. Furthermore, the optical encoder 100 has a scanning unit 106 for photoelectrically scanning the data track 104. As shown in FIG. 1, the scanning unit 106 includes a light source 110 and a lens 112, preferably a condenser or focusing lens. Note that the structure of the encoder 100 is illustrated only schematically because details of mechanical construction are well known to those of ordinary skill in the art.

Figure 2:
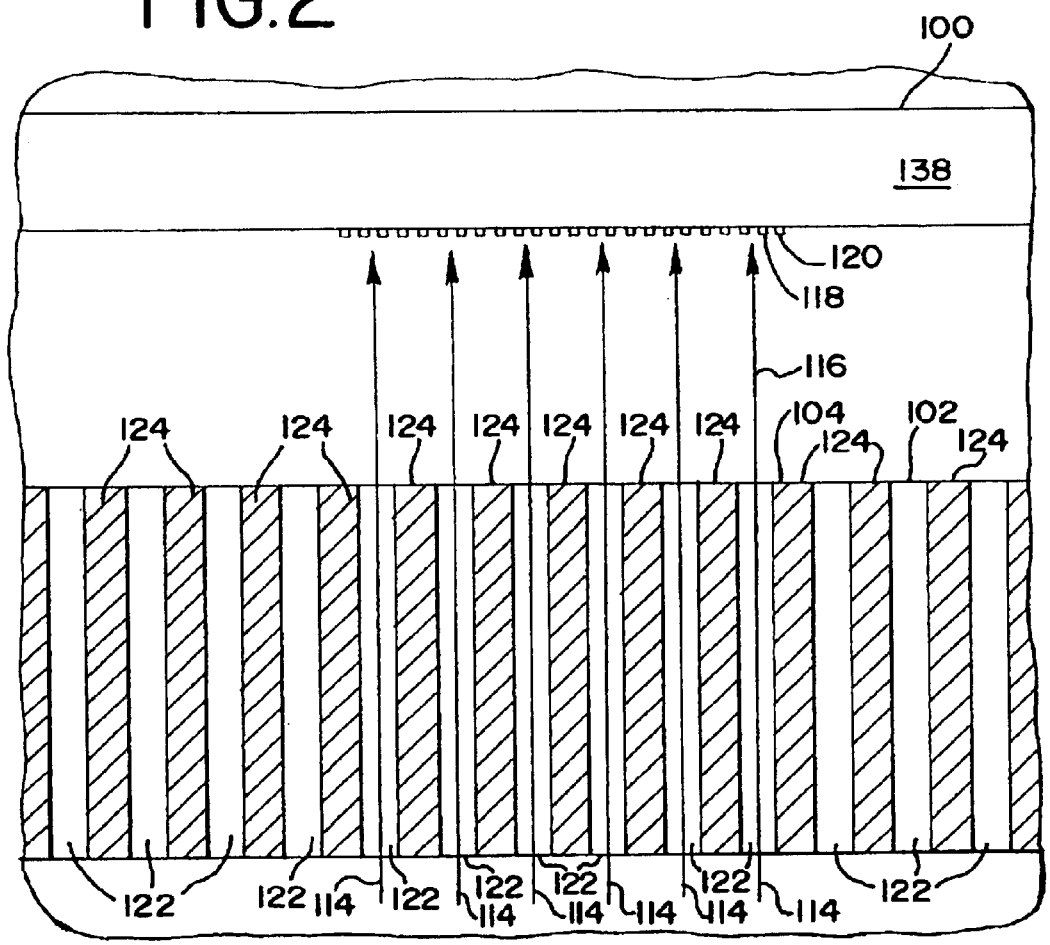
FIG. 2 is an enlarged view of the encoder with photodiode array of FIG. 1.

As shown in FIGS. 1 and 2, the light 114 emitted by the light source 110 is collimated by the condenser lens 112 and transmitted through the data track 104 on the code wheel 102 that rotates relative to the light source 110. The light 116 modulated by the rotating data track 104 is received by a photodetector array 118 of a detection system 120. The detected signals are processed in an evaluation unit, which is not shown in FIGS. 1 and 2.

As shown in FIGS. 1–3, 5, 6, 8, 9 and 11, the data track 104 includes an incremental pattern of alternating areas of different optical properties, such as alternating transparent bars 122 and non-transparent bars 124. It is possible that the data track is composed of alternating areas of high reflectance and low reflectance when the optical encoder 100 is configured to use an incident-light data track. In addition, the photodetector array 118 is made of an incremental photodiode array 126 and two index photodiode arrays 128 and 130. The photodiode arrays 126, 128 and 130 include a plurality of photodiodes 132, 134 and 136, respectively, that are arranged in separate arrays on an Opto-ASIC semiconductor chip 138 that is attached to a PC board 139.

As shown in FIGS. 3–11, the incremental photodiode array 126 has ninety six photodiodes 132, wherein adjacent photodiodes are arranged equiangularly with respect to one another and the photodiodes as a group subtend an angle of approximately 9.2°, such as 9.22°, so that the individual photodiodes have a pitch that corresponds to the highest resolution desired, such as 1012. The linear separation between adjacent photodiodes 132 is constant. The minimum separation between adjacent photodiodes 132 is approximately five microns due to a particular foundry's process design rules that limit the maximum width of the photodiodes. Every set or group of four to photodiodes are arranged within one grating period of the code disk pattern. Adjacent photodiodes in each set are arranged with respect to each other so that there results a phase delay of 90° between the output signals of adjacent photodiodes. Accordingly four adjacent photodiodes have relative phase positions of 0°, 9°, 180° and 270°. These phase-different signals are named A!, B, A, and B! signals in FIGS. 3, 5, 6, 8, 9 and 11.

The incremental photodiode array 126 includes sixteen conductor lines 140 that are interconnected with conductor lines 142 emanating from the photodiodes 132 and three incremental data resolution selection units 144, 146 and 148.

As shown in FIGS. 3, 4, 6, 7, 9 and 10, each incremental data resolution selection unit 144, 146 and 148 includes sixteen conductor lines 150 that are connected with a group of sixteen conductor lines 140 and with four output signal lines 152.

Each incremental data resolution selection unit 144, 146 and 148 has a switching signal line 154, 156 and 158, respectively. The switching signal lines 154, 156 and 158 are selectively connected to the conductor lines 150 associated with their corresponding incremental data resolution selection unit via sixteen semiconductor switches 160. Each of the semiconductor switches 160 always has the state conductive or non-conductive. The semiconductor switches 160 are used to connect different combinations of the sixteen conductor lines 140 with the four output signal lines 152. Each one of the output signal lines 152 delivers a phase different incremental scanning signal A, B, A! and B!. Note that while the above described switches are semiconductor switches, other switches are possible, such as switches that include metal links.

As shown in FIGS. 3, 5, 6, 8, 9, 11 and 12A, the index photodiode array 128 and its associated fourteen photodiodes 134 generate a first index signal Z and the index photodiode array 130 and its fourteen photodiodes 136 generate a second index signal Z!. The individual photodiodes of the index photodiode arrays 128 and 130 are enabled by the same signal that enables the individual photodiodes 130 of the photodiode array 126 that are activated to achieve a desired encoder resolution.

The index signals Z and Z! provide a unique pattern upon a complete rotation of the encoder. In particular, the index signals Z and Z! are compared and processed electronically to give an output pulse once per revolution of the encoder 100 which absolutely locates all the other encoder signals. The index signals Z and Z! are differential in nature since the code disc pattern for the Z! signal has opaque regions everywhere the code disc pattern for the Z signal has openings and vice versa. Such a differential nature eliminates common mode noise. The index signals Z and Z! are used for determining the absolute information. This unique pattern is generated by a specific optical pattern, which is optimized so as to achieve a pulse with maximum contrast between a single optical cycle, and the "background" signal present at any other time. Note that this definition depends on the optical cycle. In order to allow flexibility in the choice of resolution to be detected according to the present invention, it is necessary to change the index signals based on the resolution chosen so that a different optimized pattern for each resolution can be used. Therefore, the signals from the detectors of the arrays 128 and 136 are routed to the output signal depending on whether the unique pattern to be detected requires this signal.

The fourteen photodiodes 136 of the index photodiode array 128 are arranged so that when they are fully illuminated through corresponding openings or bars 122 in the data track 104 a single large index pulse is generated or formed. Similarly, the photodiodes 134 of the index photodiode array 130 are arranged so that when they are fully illuminated through corresponding openings or bars 122 in the data track 104 a single large index pulse is generated or formed. The light received by the index photodiode arrays 128 and 130 is not modulated. The angular widths of the index photodiode arrays 128 and 130 are chosen so that good contrast between the index signals is achieved for a range of resolutions. Each of the photodiodes 134 and 136 has a width of approximately 68 microns. A non-conductive material is present between adjacent photodiodes 134 and 136 so that the adjacent photodiodes have a separation of approximately 5.8 microns. Each of the index photodiode arrays 128 and 130 are arranged at a pitch that corresponds to one data field (360°e) of the highest desired resolution, such as 1012. The photodiodes 134 and 136 have a radial pitch equal to four times the pitch of the photodiodes 132. Because of the different scanned structures on the code disks there result different index signal forms Z, Z!. Due the possible use of code disks with different resolutions, the present invention selectively activates the fourteen photodiodes 134 and the fourteen photodiodes 136 in order to achieve the best contrast index pulse for the particular code disk 102 used. The general principle for the generation of these signals for different incremental resolution however is common to both index signal photodiode arrays 128 and 130.

Note that in the case of an angle optical encoder such as shown in FIGS. 1–13A–B, the photodiode arrays 126, 128 and 130 should have a common axis. The angular relationship between the arrays 126, 128 and 130 need not be a special value, but must be stable and have a known value.

An implicit relationship between the index arrays 128, 130 and the incremental array 126 is that the radial pitch of the individual index array elements 134, 136 is four times the pitch of the incremental array elements 132, or one data cycle wide. Because the index array patterns for all the possible encoder resolutions must be made up from the same array of index detector elements 134, 136, each resolution requires a different combination to achieve the greatest single signal from the available detector elements.

Figure 13A:
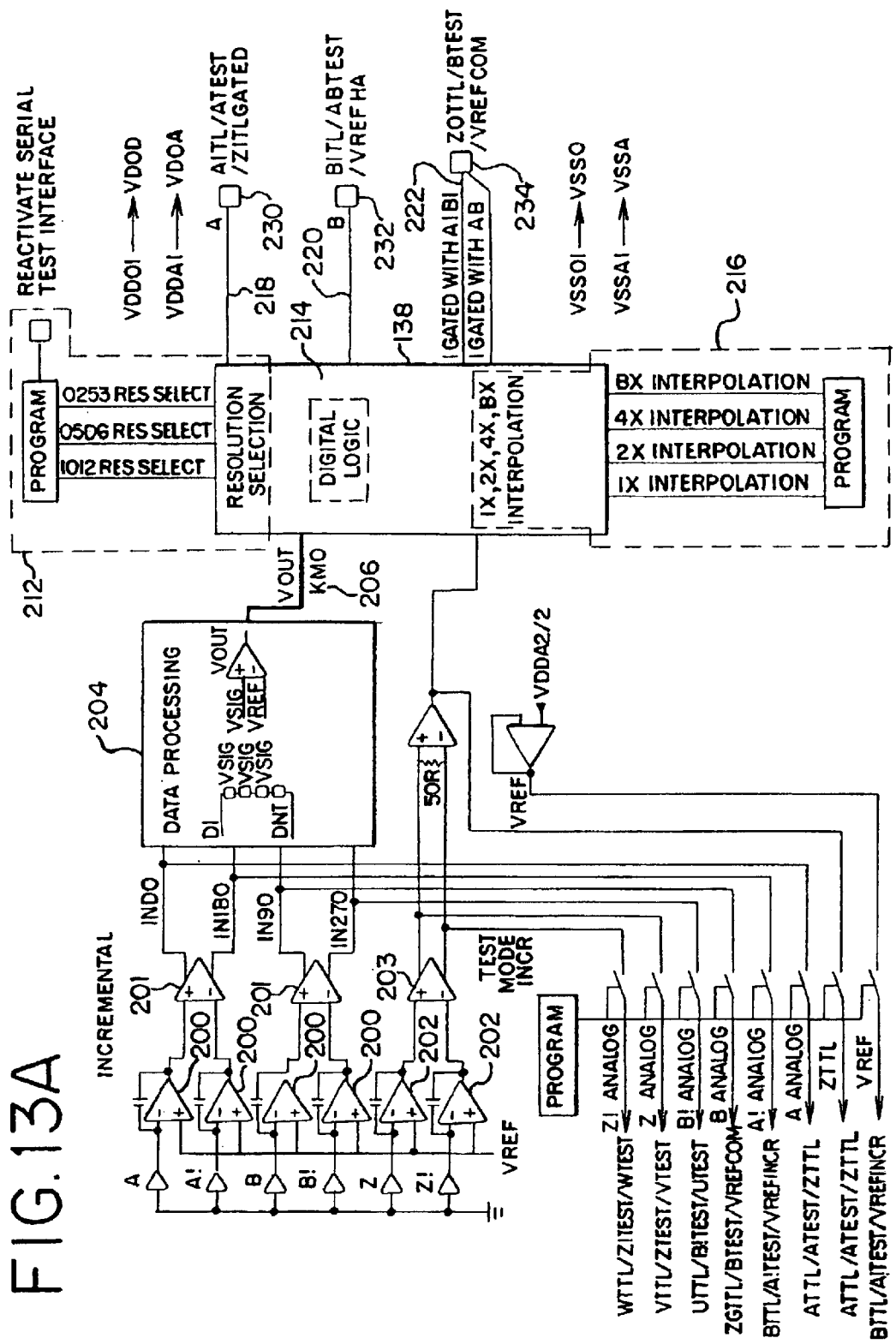
FIGS. 13A–B schematically show an embodiment of processing electronics to be used with the encoders of FIGS. 1–12 and 14–17.

As schematically shown in FIGS. 13A, the signals A, A!, B, B! from the incremental array 126 are amplified by transimpedence amplifiers 200. Then, complementary signals, A, A! and B, B!, are compared with one another via comparators 201. Similarly, the signals Z and Z! generated by the index arrays 128 and 130 are amplified by transimpedence amplifiers 202 and compared by comparator 203. The signals from comparators 201, 203 are then fed to a data processing element 204. The data processing element 204 produces from sixteen phased analog voltage signals all of the sixteen properly phased outputs 206 required to make outputs for the 1X, 2X, 4X and 8X detected frequencies. The outputs 206 are directed to a digital logic section 214, which combines the output signals 206 and programmed interpolation choices from an interpolation section 216 to create higher frequency signals by combining the four fundamental (regardless of the resolution selected) signals that are each offset from one other by 90°. As shown in FIG. 13A, several output signals from the chip 138 result. For example, two digital 50% duty cycle data pulses 218 and 220 offset by 90° are output. In addition, a single digital index pulse 222 that is gated with either signal AB or signal A!B! is generated. Note that, for test and evaluation purposes, there are three possible programmed viewing possibilities, such as digital output, analog test mode 1 and analog test mode 2, at the output pads 230, 232, 234 as represented by the labels on the outputs, separated by slashes.

The selection of the resolution of the arrays 126, 128 and 130, as well as a number of other selectable options in the electronics, is made through a serial test and programming interface 212 of the chip 138.

Figure 13B:
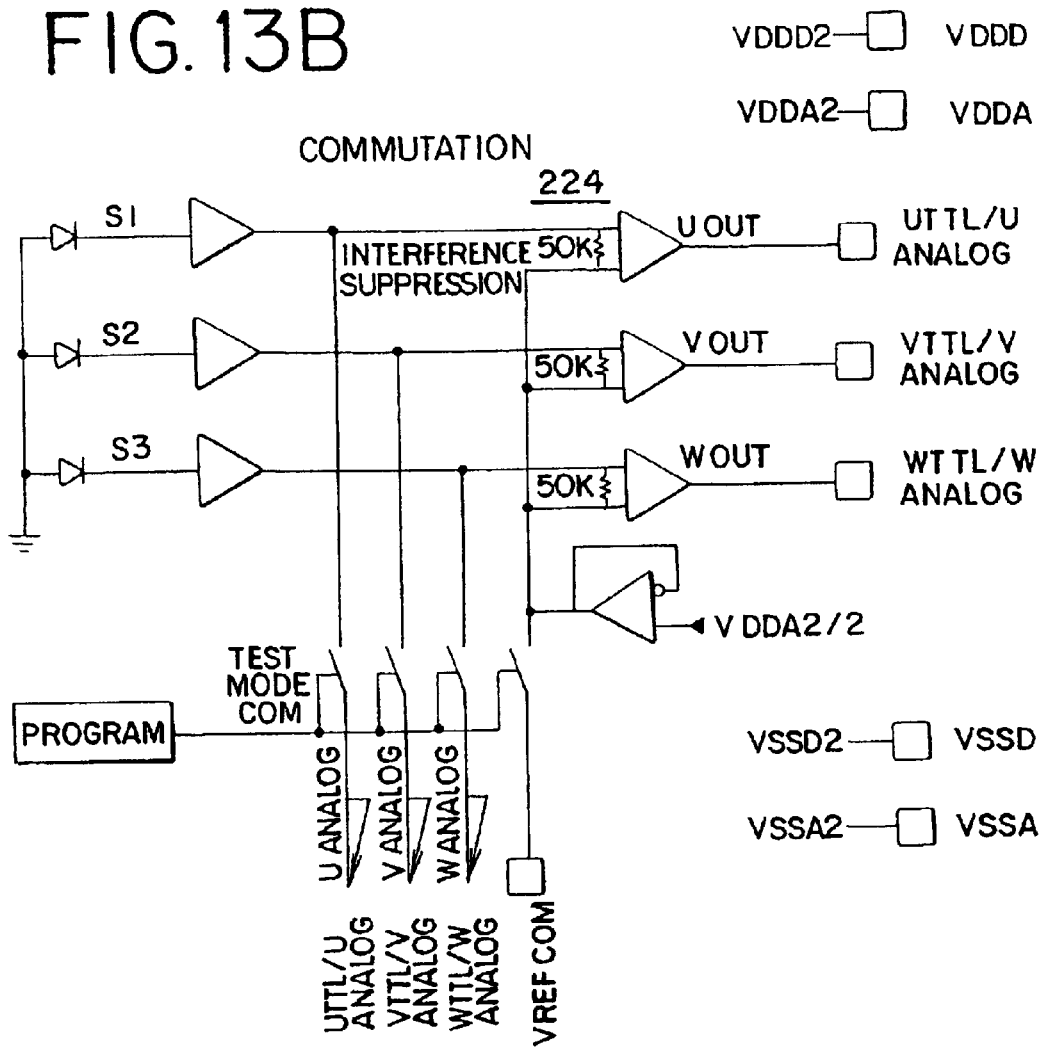

The single ended commutation section 224 shown in FIG. 13B is the same for all resolutions. The commutation section 224 produces three signals that are each phase shifted by 120° electrical. The three signals are generally referenced to the rising edge of the index signal and are used to align (the brush axis of) the motor on which the encoder is mounted. The manner in which a quasi-common mode reference signal is achieved between the three single ended commutation signals is described in U.S. Pat. Nos. 5,936,236 and 6,175,109, the entire contents of each of which are incorporated herein by reference. Note that the above-described method of generating a common mode reference signal can be accomplished using CMOS technology.

With the above description of the photodiode arrays 126, 128 and 130 in mind, the ability to change resolutions while using the same photodiode arrays 126, 128 and 130 is described hereafter. In particular, there is preferaby always a fixed number and arrangement of index signal photodiodes 134 and 136. Note that in the discussion above and to follow a resolution of N means that the complete circumference of the data track 104 being scanned has N total number of alternating transparent bars 122 and non-transparent bars 124.

Figure 3:
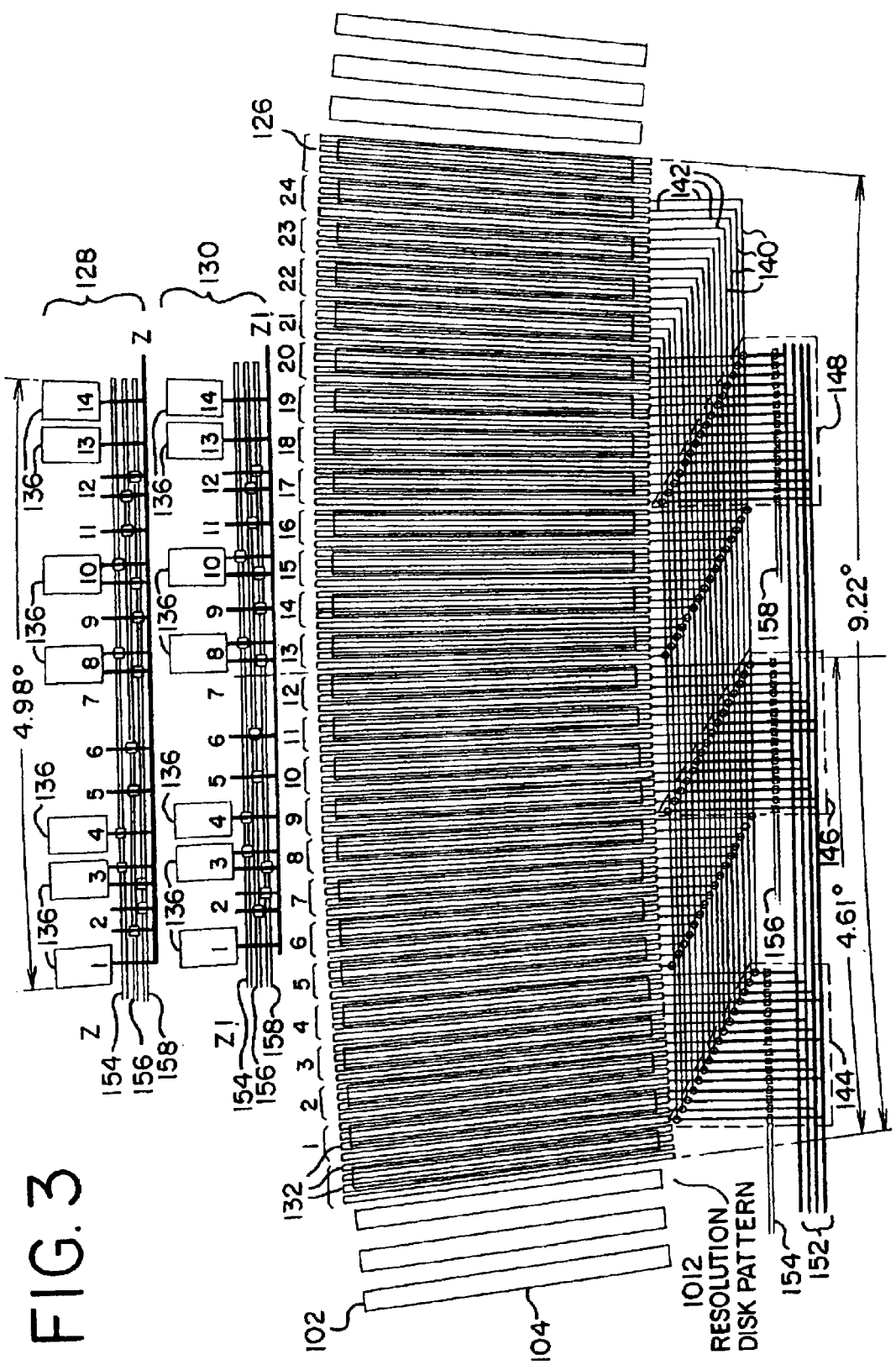
FIG. 3 schematically shows the encoder and photodiode array of FIG. 1 when configured for providing a resolution of 1012 and a resolution disk pattern of 1012.
Figure 4:
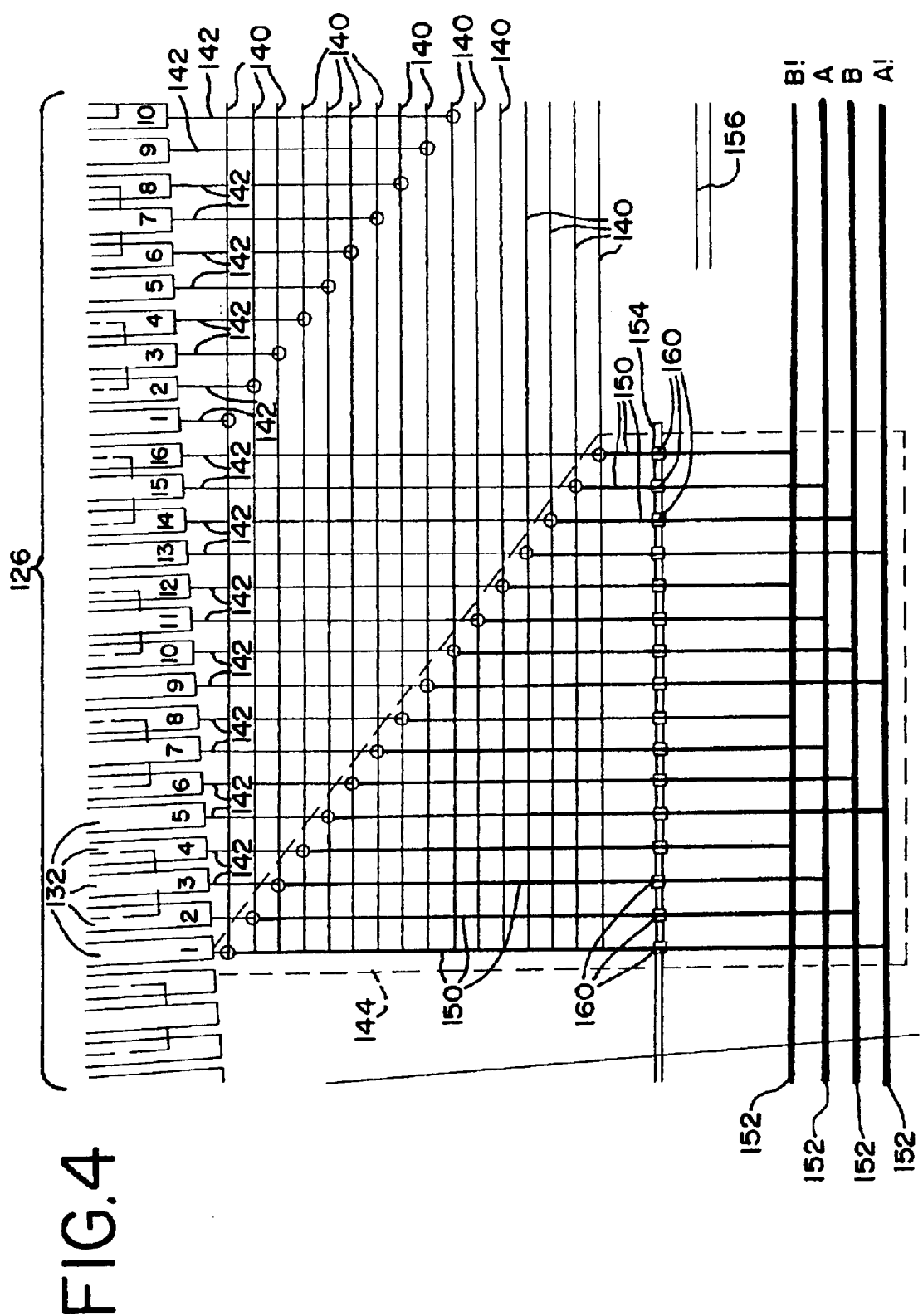
FIG. 4 schematically shows an enlarged view of transmission gates of the encoder and photodiode array of FIG. 3.

In the case of achieving a resolution of 1012 when the data track has a resolution of 1012, incremental data resolution selection unit 144 is activated via an activation signal generated by the resolution selection logic of an Opto-ASIC semiconductor chip 138 and sent along the switching signal line 154. Upon receipt of the activation signal, the incremental data resolution selection unit 144 opens and closes the semiconductor switches 160 of the unit 144 so that a certain combination of the sixteen conductor lines 140 are connected with the four output signal lines 152. In the case of achieving a resolution of 1012, the incremental data resolution selection unit 144 groups the photodiodes 132 so that every four consecutive and adjacent photodiodes is formed into a group. As shown in FIGS. 3 and 4, each group of four photodiodes are connected with the output signal lines 152 so that signals from the first photodiode of the group is sent to the A! output signal line 152, signals from the second photodiode of the group is sent to the B output signal line 152, signals from the third photodiode of the group is sent to the An output signal line 152 and the fourth photodiode of the group is sent to the B! output signal line 152. As shown in FIGS. 3 and 4, the result of such a connection is that a number of the photodiodes 132 are interdigitated with every fourth photodiode 132, each acting as a group of one photodiode, is bussed onto a single ouput signal line 152.

Figure 5:
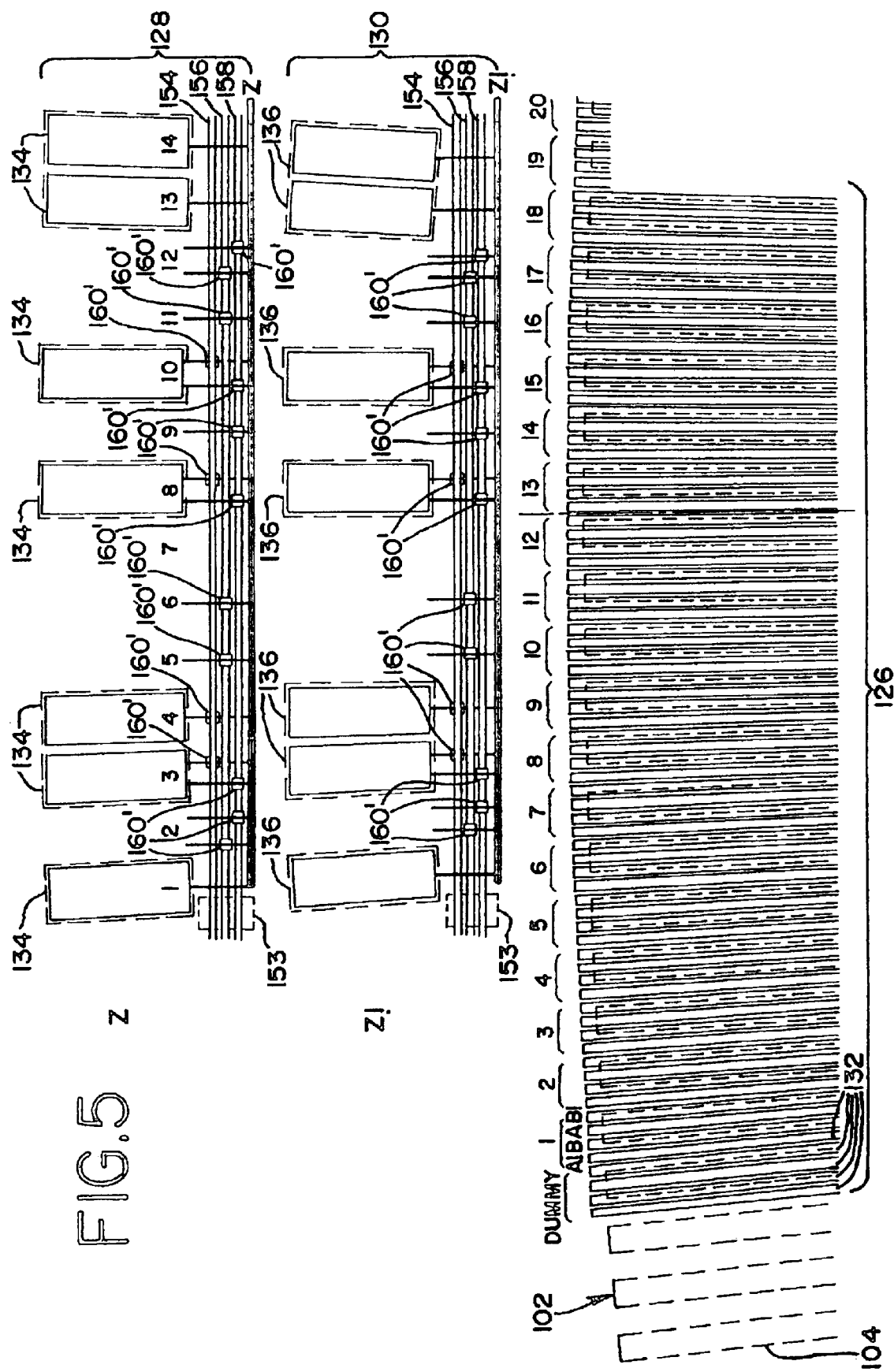
FIG. 5 schematically shows an enlarged view of index and incremental photodiodes of the encoder and photodiode array of FIG. 3.

In addition, an index resolution selection unit 153 selects certain ones of the photodiodes of the index arrays 128, 130 for a particular resolution, wherein all of the photodiodes are active at the time of selection. Such selection is accomplished via switching signal line 154 and switches 160'. For all resolutions, the active photodiodes 1, 14 and 15 are permanently connected to the switching signal lines 154, 156, 158. Regarding the remaining active photodiodes, photodiodes 2 and 12 have two separate lines and switches 160' connected to switching signal lines 156 and 158. Photodiodes 3, 8 and 10 have separate lines and switches 160' connected to switching signal lines 154 and 158. Photodiode 4 is connected to switching line 154 via switch 160'. Photodiodes 5, 6 and 11 are connected to switching line 156 via switches 160' and photodiode 9 is connected to switching line 158 via a switch 160'. When a resolution of 1012 is desired, index resolution selection unit 153 activates, via switching line 154, certain switches 160' so that only photodiodes nos. 1, 3, 4, 9,10,13, and 14 of the index photodiode arrays 128, 130 are selected, as shown in FIGS. 3, 5 and 12B. The switching signal line 154 and switches 160' are programmed for a particular resolution via a code supplied externally through a serial interface. The resolution of the photodiode arrays 128 and 130 are selected simultaneously with and by the same coded programming signal that selects the resolution for the array 126.

Note that the photodiodes activated, via resolution selection unit 153, in the index photodiode arrays for a particular resolution are determined by determining the combination of photodiodes that optimize the index signal for a particular resolution. In other words, the photodiodes are chosen to give the largest ratio of single large central signal to smallest immediately adjacent signals for a particular resolution. A computer program can be prepared so as to compare all combinations of photodiodes as a matching disc pattern passes over them and select the combination with the best ratio.

In the case of a resolution of 1012, a 1012-count disc is passed over the fourteen photodiodes shown in FIG. 5. After testing all viable combinations, the best ratio is determined to occur when the seven photodiodes numbered 1, 3, 4, 8, 10, 13 and 14 are activated. This combination results in a center signal from seven photodiodes when the disc pattern and the sensor pattern are superimposed. As the disc approaches and leaves the central location a maximum of two diodes and disc patterns coincide. The result is a signal to non-signal ratio of 7:2. This difference allows the electronics to process only the central signal that has the desired width of a single data cycle but the intensity of seven diodes.

In the case of a resolution of 506, it has a data cycle that is twice the width of the individual photodiodes of the 1024 scenario. In order to compensate for the length of the data cycle, adjacent ones of the fourteen individual photodiodes are grouped in pairs. Each pair of grouped photodiodes is treated as a single photodiode for the 506 resolution scenario. Therefore, the optimal index signal has to be determined for seven such paired/grouped photodiodes. The best signal to non-signal ratio turns out to be the 506-resolution configuration selection of the four groups of photodiodes, 1&2, 5&6, 11&12 and 13&14. The result is a signal to non-signal ratio of 4:1.

In the case of a resolution of 253, it has a data cycle that is four times the width of the individual photodiodes of the 1024 scenario. However, the array of fourteen individual photodiodes is only 3.5 253-resolution cycles wide. Since it is not possible to group 3.5 adjacent detectors with each other, a compromise is performed by grouping adjacent detectors in groups so that the 253-resolution detectors are three 253-resolution cycles wide while at the same time are spaced on a 253-resolution pitch. As a result, four groups of four virtual photodiodes are formed wherein each virtual photodiode has a width equal to ¾ that of a real photodiode. Based on the above construction, an optimal index signal is found to occur when three of the four groups are selected. The three groups correspond to photodiodes, 1, 2 & 3; 8, 9 & 10; and 12,13 &14. The result is a signal to non-signal ratio of 3:1.

Note that the resolutions can be changed from any one of the resolutions 1012, 506 and 253 to any one of the other resolutions. For example, other resolutions are possible for the incremental photodiode array 126 when other code wheels 102 or other resolutions for the code wheel 102 are used. Such resolutions are achieved by simply choosing the necessary resolution by activating the semiconductor switches 160 in the corresponding incremental data resolution selection unit and switching them all into the conductive state. Thus, the resolution is changed without altering the arrangement of the photodiodes of the photodiode array 126. The semicondictor switches 160 are activated by a resolution selection logic which is implemented in the same Opto-ASIC semiconductor chip 138 mentioned previously.

Figure 6:
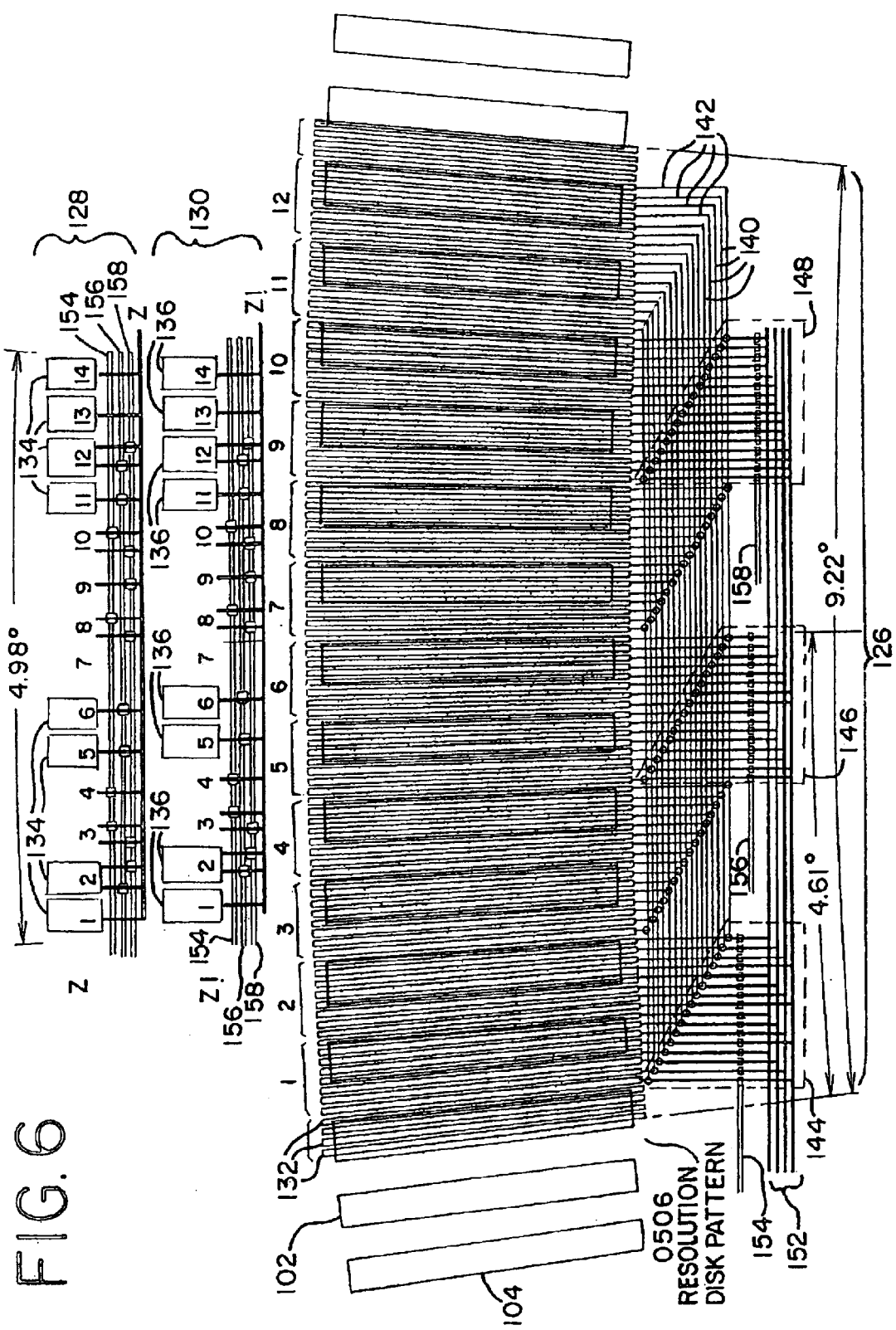
FIG. 6 schematically shows the encoder and photodiode array of FIG. 1 when configured for providing a resolution of 506 and a resolution disk pattern of 506.
Figure 7:
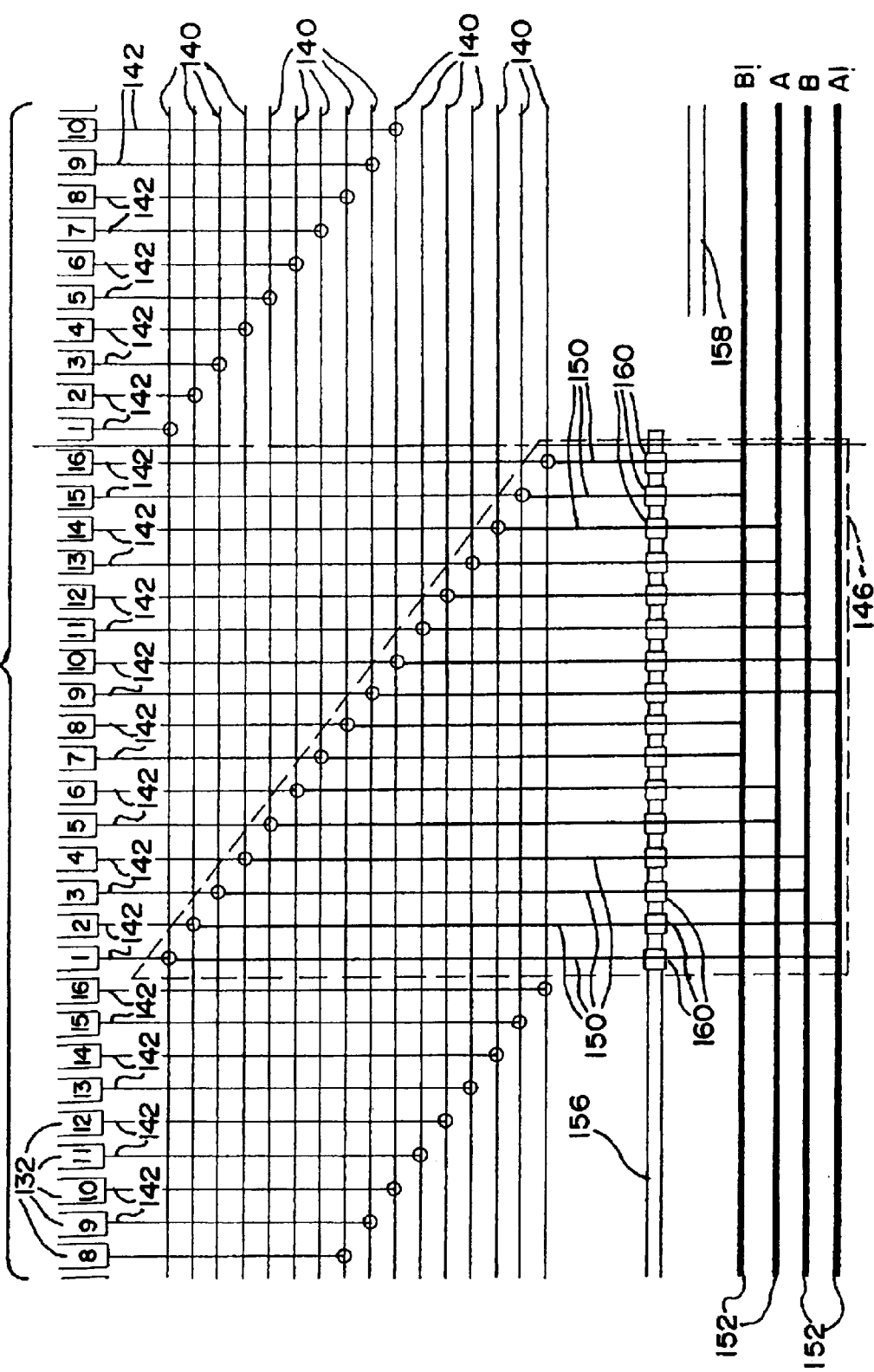
FIG. 7 schematically shows an enlarged view of transmission gates of the encoder and photodiode array of FIG. 6.
Figure 8:
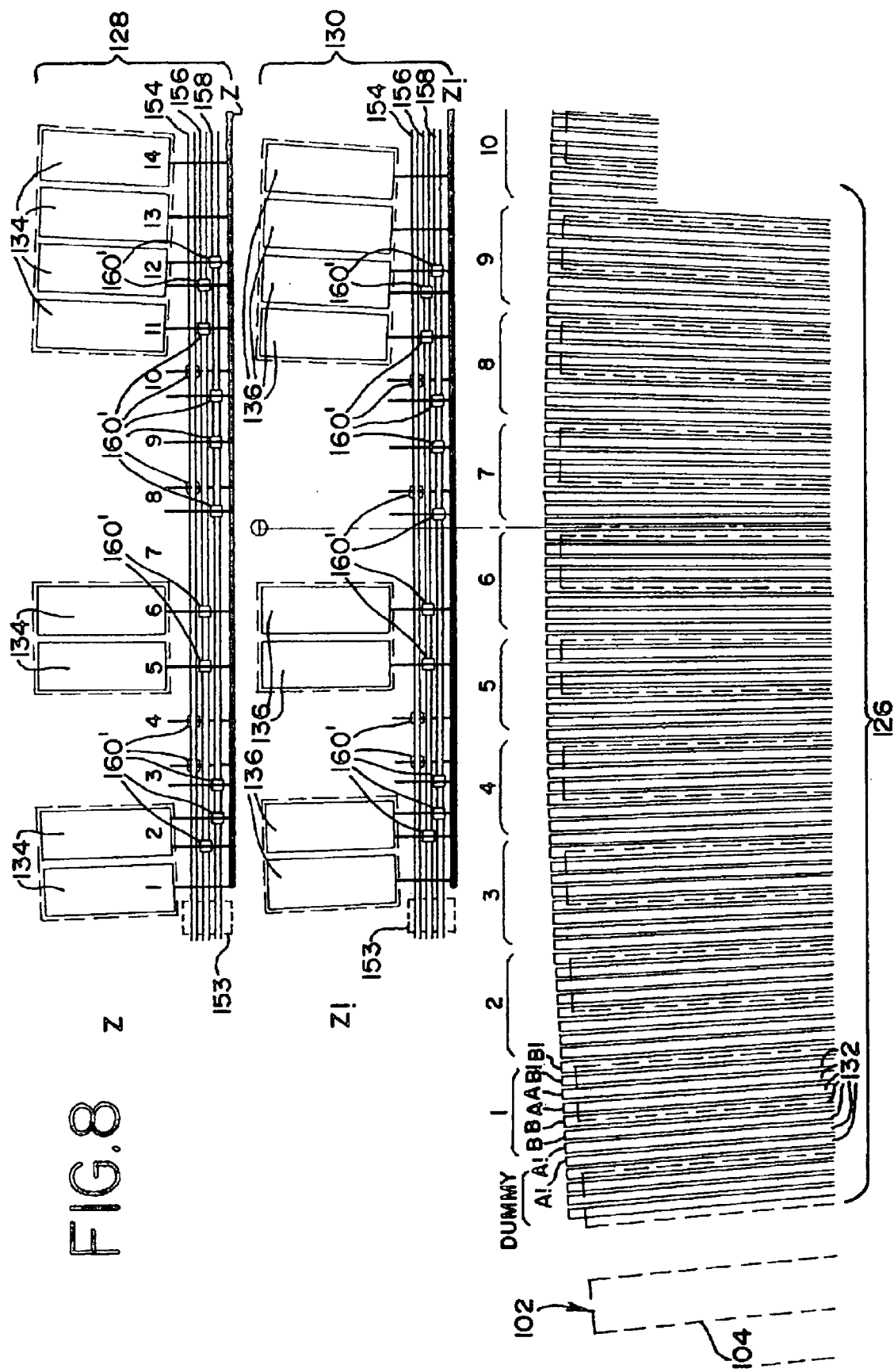
FIG. 8 schematically shows an enlarged view of index and incremental photodiodes of the encoder and photodiode array of FIG. 6.

One example of changing the resolution of the photodiode array 126 is shown in FIGS. 6–8. In this example, a resolution of 506 is achieved by sending an activation signal along the resolution switching line 156 that causes the incremental data resolution selection unit 146 to open and close the semiconductor switches 160 of the unit 146 so that a certain combination of the sixteen conductor lines 140 are connected with the four output signal lines 152. In particular, the incremental data resolution selection unit 146 defines groups of photodiodes 132 within the photodiode array 126 so that every eight consecutive and adjacent photodiodes is formed into a group. Thus, twelve groups of eight photodiodes are formed. As shown in FIG. 7, each group of eight photodiodes are connected with the output signal lines 152 so that signals from the first two photodiodes of the group are sent to the A! output signal line 152, signals from the second pair of photodiodes of the group are sent to the B output signal line 152, signals from the third pair of photodiodes of the group are sent to the A output signal line 152 and the fourth pair of photodiodes of the group are sent to the B! output signal line 152. In essence, the pairing of photodiodes increases the effective size of the detector area corresponding to photodiodes generating the output signals A!, A, B! and B by a factor of two and, thus, decreases the resolution of the array by a factor of two. In addition, only photodiodes nos. 1, 2, 5, 6 and 11–14 of the index arrays 128 and 130 are selected by index resolution selection unit 153 via the resolution swich line 156 as shown in FIGS. 6, 8 and 12C.

Figure 9:
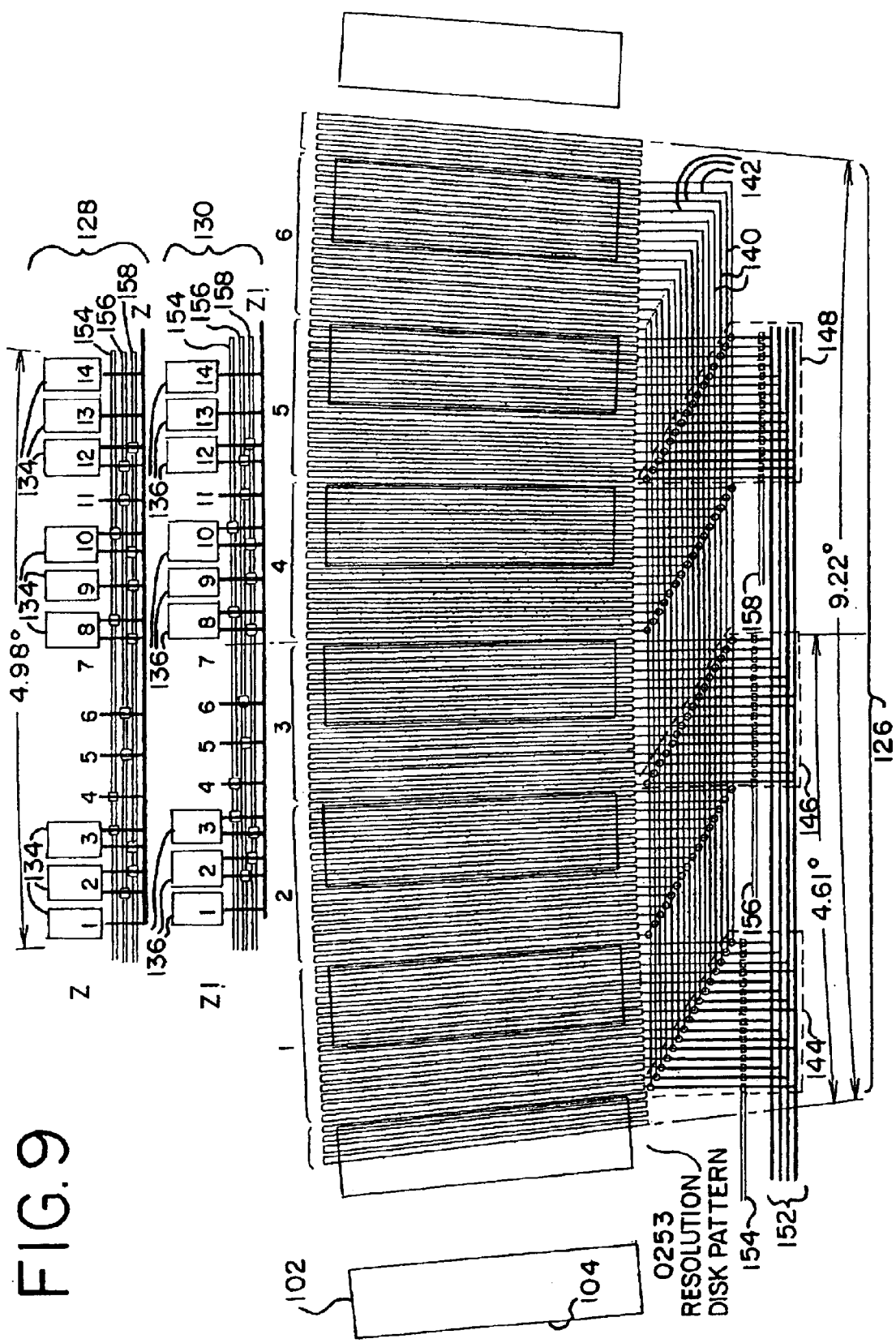
FIG. 9 schematically shows the encoder and photodiode array of FIG. 1 when configured for providing a resolution of 253 and a resolution disk pattern of 253.
Figure 10:
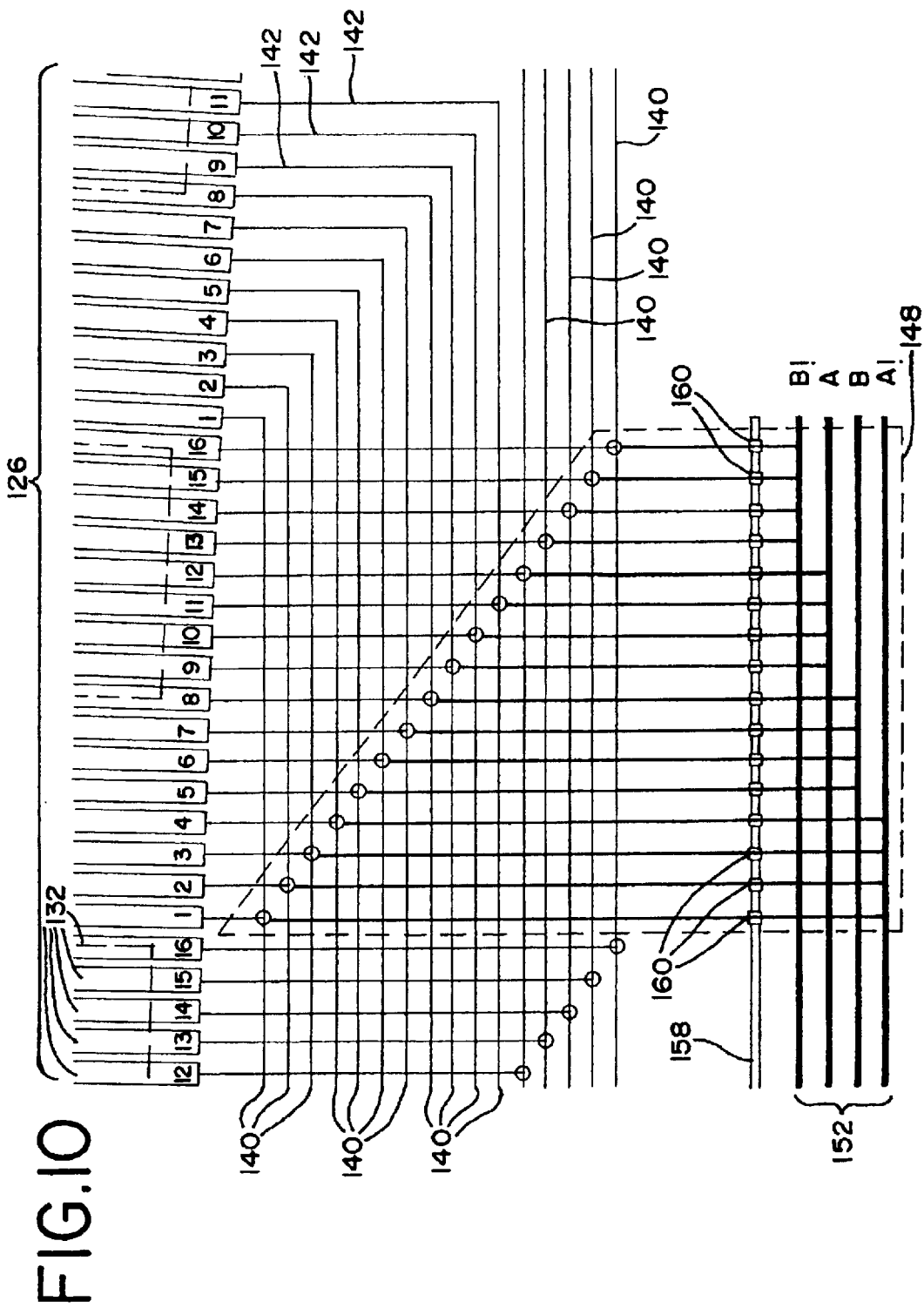
FIG. 10 schematically shows an enlarged view of transmission gates of the encoder and photodiode array of FIG. 10.

In another example, a resolution of 253 is achieved by sending an activation signal along the resolution switch line 158 that causes the incremental data resolution selection unit 148 to open and close the semiconductor switches 160 of the unit 148 so that a certain combination of the sixteen conductor lines 140 are connected with the four output signal lines 152. In particular, the incremental data resolution selection unit 148 defines groups of the photodiodes 132 within the photodiode array 126 so that every sixteen consecutive and adjacent photodiodes is formed into a group. Thus, six groups of sixteen photodiodes are formed. As shown in FIGS. 9 and 10, each group of sixteen photodiodes are connected with the output signal lines 152 so that signals from the first four photodiodes of the group are sent to the A! output signal line 152, signals from the second quartet of photodiodes of the group are sent to the B output signal line 152, signals from the third quartet of photodiodes of the group are sent to the A output signal line 152 and the fourth quartet of photodiodes of the group are sent to the B! output signal line 152. In addition, only photodiodes nos. 1–3, 8–10 and 12–14 of the index arrays 128 and 130 are selected via index resolution selection unit 153 via switching signal line 158 and switches 160' as shown in FIGS. 9, 11 and 12A.

While the above examples demonstrate changing the resolution of the incremental photodiode array 126, it is also possible to choose the appropriate combination of the available index photodiodes 134, 136 for generating an index signal with the appropriate resolution.

In the above embodiments, lower resolutions of 506 and 253 are generated by grouping the photodiodes 132 in multiples of two. Of course, other resolutions are possible using the same principles discussed above with respect to the embodiments of FIGS. 1–13A–B by forming groups with an integral number N of photodiodes 132 where N=3, 4, 5, . . . , etc.

Note that one advantage of the above described embodiments is that the total number of photodiodes 132 connected to each of the four output signals, A, A!, B and B! is constant irrespective of the resolution chosen for the optical encoder 100. In addition, for each selected resolution all of the photodiodes 132 are used by the optical encoder 100. This is in direct contrast with the system described in EP 0 710 819 where the array elements are activated based on an adaptation phase where a photocell assembly is scanned and the photocell assembly's output is evaluated. In the embodiments previously described, each of the four output signals will have 24 photodiodes associated therewith when 96 total photodiodes 132 are employed. Maintaining a constant number of photodiodes per signal for any resolution improves the later processing of the signals.

On another matter, the above-described optical encoder 100 has been described where the switching between resolutions is performed during operation of the optical encoder 100 pursuant to application of a control mechanism. It is also possible to switch the resolution as a one time decision at any point during manufacture. No matter the mode of switching, the embodiments of the present invention intend that the signals passing through the switches operate fast, and the speed of switch operation can be slow.

It is to be understood that the forms of the invention described herewith are to be taken as preferred embodiments and that various charges in the shape, size and arrangement of parts may be resorted to, without departing from the spirit of the invention or the scope of the claims. For example, the present invention is not limited to rotary encoders. It is also applicable in linear encoders with linearly arranged data tracks. The present invention can be adapted for other resolutions by using different groupings of adjacent photodiodes, such as groups of greater than four. In addition, the sensor arrays can be in the form of a semiconductor sensor chip that is separate from the Opto-ASIC chip. Furthermore, different optical principles can be realized on the basis of the present invention, such as transmitted light arrangements as described in FIG. 1 as well as reflected light arrangements, such as the arrangement shown in FIG. 18.

Figure 14:
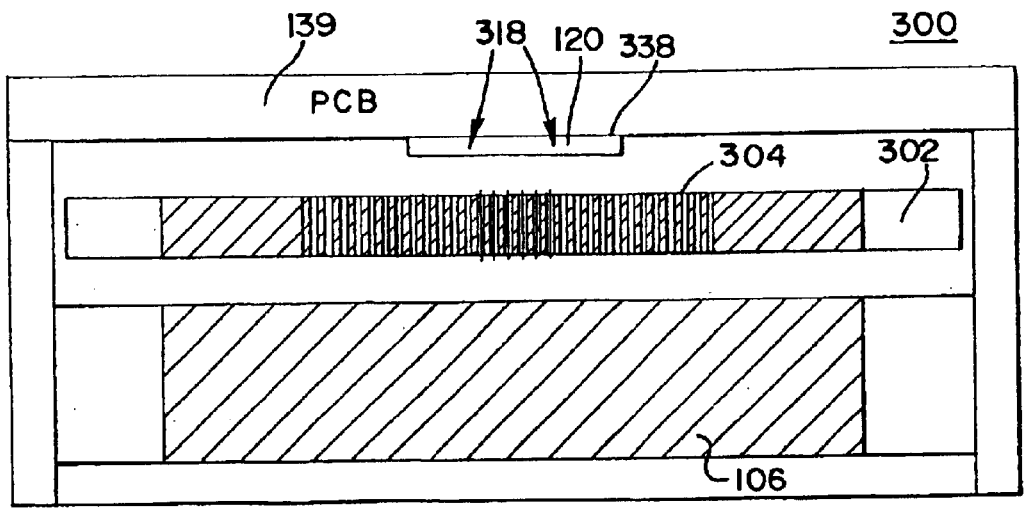
FIG. 14 schematically shows a side view of an embodiment of a magnetic encoder and detector array according to the present invention.

In another variation schematically shown in FIGS. 14 and 15, the optical encoder of FIGS. 1–13 is altered so that a magnetic encoder 300 is produced which incorporates the same principles as the encoder 100 described previously. Note that FIGS. 14–17 use like numerals for like elements that are described and shown with respect to FIGS. 1–13. In the magnetic encoder 300 a light source is not necessary. In addition, the data track 304 of the rotatable code wheel 302 that is mounted to a shaft includes alternating regions having different magnet properties. The detector array 318 and its incremental detector array 326 and index detector arrays 328 and 330 are similar to the detector arrays 118, 126, 128 and 130, respectively, where the photodiodes 132, 134, 136 have been replaced by magnetic field detectors 332, 334, 336. The signals generated by the detector array 326 are processed and the resolution of the magnetic encoder 300 are processed and controlled by a semiconductor chip 338 and circuitry in a manner similar to that shown in FIGS. 13A–B.

In the reflected light arrangement of FIG. 18 mentioned previously, the optical encoder of FIGS. 1–13 is altered so that an optical encoder 400 is produced which incorporates the same principles as the encoder 100 described previously. Note that FIG. 18 use like numerals for like elements that are described and shown with respect to FIGS. 1–13. In the optical encoder 400, the light source 110 is mounted to the semiconductor chip 138 or PC board 139 so that the scanning unit 106' includes the detector array 118. In addition, a reflective lens 402 is placed so that the code wheel 102 is positioned between the light source 110 and the reflective lens 402. Thus, light from the light source 110 passes through the rotatable code wheel 102, is reflected by the reflective lens 402 back through the code wheel 102 so that it reaches the detector array 118 and its incremental detector array 126 and index detector arrays 128 and 130. The signals generated by the detector array 126 are processed and the resolution of the optical encoder 400 are processed and controlled by the semiconductor chip 138 and circuitry in a manner similar to that shown in FIGS. 13A–B.

We claim:

1. An optical encoder for providing position information of an object, which moves along a certain measuring direction, the encoder comprising:
   a light source that emits light;
   a data track attached to an object that moves relative to said light source, said data track receiving said light and comprising a plurality of alternating areas of different optical properties of a particular resolution;
   a detection system that receives modulated light from said data track and generates a position signal from said received light, said detection system comprising:
   a photodiode array that receives said modulated light from said data track, and
   a resolution selection unit connected to said photodiode array and which controls and selects a resolution of said photodiode array, wherein all photodiodes associated with said photodiode array are active irrespective of a resolution selected by said resolution selection unit.

2. The optical encoder of claim 1, wherein said plurality of alternating areas of different optical properties comprise alternating transparent areas and non-transparent areas of a particular resolution.

3. The optical encoder of claim 1, wherein said resolution selection unit controls said resolution by controlling the effective size of a detector area corresponding to photodiodes of said photodiode array that generate an output signal.

4. The optical encoder of claim 1, wherein said resolution selection unit defines groups of photodiodes within said photodiode array.

5. The optical encoder of claim 4, wherein said groups of photodiodes consist of a single photodiode.

6. The optical encoder of claim 5, wherein said resolution of said photodiode array is 1012.

7. The optical encoder of claim 4, wherein said groups of photodiodes comprise at least two adjacent photodiodes.

8. The optical encoder of claim 7, wherein said resolution of said photodiode array is 506.

9. The optical encoder of claim 4, wherein said groups of photodiodes comprise at least four adjacent photodiodes.

10. The optical encoder of claim 9, wherein said resolution of said photodiode array is 253.

11. The optical encoder of claim 4, wherein one of said groups of photodiodes corresponds to a first phase of a first output signal and a second one of said groups corresponds to a second phase of a second output signal.

12. The optical encoder of claim 4, wherein one of said groups of photodiodes corresponds to a first phase of a first output signal, a second one of said groups corresponds to a second phase of a second output signal, a third one of said groups corresponds to a third phase of a third output signal and a fourth one of said groups corresponds to a fourth phase of a fourth output signal.

13. The optical encoder of claim 12, wherein said first phase is 0°, said second phase is 90°, said third phase is 180° and said fourth phase is 270°.

14. The optical encoder of claim 5, wherein one of said groups of photodiodes corresponds to a first phase of a first output signal, a second one of said groups corresponds to a second phase of a second output signal, a third one of said groups corresponds to a third phase of a third output signal and a fourth one of said groups corresponds to a fourth phase of a fourth output signal.

15. The optical encoder of claim 14, wherein said first phase is 0°, said second phase is 90°, said third phase is 180° and said fourth phase is 270°.

16. The optical encoder of claim 7, wherein one of said groups of photodiodes corresponds to a first phase of a first output signal, a second one of said groups corresponds to a second phase of a second output signal, a third one of said groups corresponds to a third phase of a third output signal and a fourth one of said groups corresponds to a fourth phase of a fourth output signal.

17. The optical encoder of claim 16, wherein said first phase is 0°, said second phase is 90°, said third phase is 180° and said fourth phase is 270°.

18. The optical encoder of claim 9, wherein one of said groups of photodiodes corresponds to a first phase of a first output signal, a second one of said groups corresponds to a second phase of a second output signal, a third one of said groups corresponds to a third phase of a third output signal and a fourth one of said groups corresponds to a fourth phase of a fourth output signal.

19. The optical encoder of claim 18, wherein said first phase is 0°, said second phase is 90°, said third phase is 180° and said fourth phase is 270°.

20. The optical encoder of claim 1, wherein said detection system further comprises a switching signal line that is connected to said resolution selection unit via a plurality of switches that connect outputs from said photodiode array to a plurality of output lines, wherein each output line has a specific phase delay associated therewith.

21. The optical encoder of claim 1, wherein said resolution of said photodiode controlled by said resolution selection unit corresponds to said particular resolution of said data track.

22. The optical encoder of claim 1, wherein said data track rotates relative to said light source.

23. The optical encoder of claim 1, wherein said data track is mounted on a code wheel that is attached to a rotating shaft.

24. The optical encoder of claim 1, wherein said photodiode array is arranged on an Opto-ASIC semiconductor chip.

25. A method of controlling the resolution of an optical encoder for providing position information of an object which moves along a certain measuring direction, said optical encoder comprising a light source that emits light, a data track that moves relative to said light source, the method comprising:
   directing modulated light from said data track to a plurality of photodiodes of a detection system having a resolution that has a first value; and
   changing said resolution of said detection system to a second value without altering an arrangement of said plurality of photodiodes of said detection system during said changing from said first value to said second value.

26. The method of claim 25, wherein said changing said resolution comprises changing the effective size of a detector area corresponding to a number of said plurality of photodiodes that generate an output signal.

27. The method of claim 25, wherein said changing comprises defining groups of said plurality of photodiodes.

28. The method of claim 27, wherein said groups of said plurality of photodiodes comprise at least two adjacent photodiodes.

29. The method of claim 27, wherein said groups of said plurality of photodiodes comprise at least four adjacent photodiodes.

30. The method of claim 28, further comprising:
   generating a first output signal of a first phase from signals generated from one of said defined groups of photodiodes; and
   generating a second output signal of a second phase from signals generated from a second one of said defined groups of photodiodes.

31. The method of claim 28, further comprising:
   generating a first output signal of a first phase from signals generated from one of said defined groups of photodiodes;
   generating a second output signal of a second phase from signals generated from a second one of said defined groups of photodiodes;
   generating a third output signal of a third phase from signals generated from a third one of said defined groups of photodiodes; and
   generating a fourth output signal of a second phase from signals generated from a fourth one of said defined groups of photodiodes.

32. The method of claim 31, wherein said first phase is 0°, said second phase is 90°, said third phase is 180° and said fourth phase is 270°.

33. An optical encoder for providing position information of an object, which moves along a certain measuring direction, the encoder comprising:
   a light source that emits light;
   a data track attached to an object that moves relative to said light source, said data track receiving said light and comprising a plurality of alternating areas of different optical properties of a particular resolution;
   a detection system that receives light from said data track and generates an index signal from said received light, said detection system comprising:
      an index photodiode array that receives said light from said data track and generates an index signal; and
      a resolution selection unit connected to said index photodiode array and which controls contrast of said index signal, wherein all photodiodes associated with said photodiode array are active irrespective of a resolution selected by said resolution selection unit.

34. The optical encoder of claim 33, wherein said plurality of alternating areas of different optical properties comprise alternating transparent areas and non-transparent areas of a particular resolution.

35. The optical encoder of claim 33, further comprising a second photodiode array that receives said light from said data track and generates a second index signal.

36. The optical encoder of claim 33, wherein said resolution selection unit selectively activates photodiodes within said index photodiode array in order to optimize said index signal.

37. The optical encoder of claim 36, wherein said particular resolution of said data track is 1012.

38. The optical encoder of claim 36, wherein said particular resolution of said data track is 506.

39. The optical encoder of claim 36, wherein said particular resolution of said data track is 253.

40. The optical encoder of claim 33, wherein said data track rotates relative to said light source.

41. The optical encoder of claim 33, wherein said data track is mounted on a code wheel that is attached to a rotating shaft.

42. The optical encoder of claim 33, wherein said index photodiode array is arranged on an Opto-ASIC semiconductor chip.

43. A method of controlling an index signal of an optical encoder for providing position information of an object which moves along a certain measuring direction, said optical encoder comprising a light source that emits light, a data track that moves relative to said light source and has a given resolution, the method comprising:
   directing light from said data track to a plurality of photodiodes of an index photodiode array; and
   changing an activation status of one or more of said photodiodes of said index photodiode array without altering an arrangement of said photodiodes of said index photodiode array so as to form an index signal.

44. The method of claim 43, wherein said changing results in optimization of said index signal based on said resolution of said data track.

45. An optical encoder for providing position information of an object, which moves along a certain measuring direction, the encoder comprising:
   a light source that emits light;
   a data track attached to an object that moves relative to said light source, said data track receiving said light and comprising a plurality of alternating areas of different optical properties of a particular resolution;
   a detection system that receives modulated light from said data track and generates a position signal and an index signal from said received light, said detection system comprising:
      a photodiode array that receives said modulated light from said data track;
      an index photodiode array that receives light from said data track and generates an index signal; and
      a resolution selection unit connected to said photodiode array and which controls a resolution of said photodiode array and controls contrast of said index signal.

46. A method of controlling the resolution of an optical encoder for providing position information of an object which moves along a certain measuring direction, said optical encoder comprising a light source that emits light, a data track that moves relative to said light source, the method comprising:

directing modulated light from said data track to a plurality of photodiodes of a detection system having a resolution that has a first value;

directing light from said data track to a plurality of photodiodes of an index photodiode array;

changing said resolution of said detection system to a second value without altering an arrangement of said plurality of photodiodes of said detection system during said changing from said first value to said second value;

changing an activation status of one or more of said photodiodes of said index photodiode array without altering an arrangement of said photodiodes of said index photodiode array so as to form an index signal.

47. A magnetic encoder for providing position information of an object, which moves along a certain measuring direction, the encoder comprising:

a data track attached to an object that moves relative to a detection system, said data track comprising a plurality of alternating areas of different magnetic properties of a particular resolution;

a detection system that receives magnetic energy from said data track and generates a position signal from said received magnetic energy, said detection system comprising:

a detector array that receives said magnetic energy from said data track; and a resolution selection unit connected to said detector array and which controls and selects a resolution of said detector array, wherein all detectors associated with said detector array are active irrespective of a resolution selected by said resolution selection unit.

* * * * *

UNITED STATES PATENT AND TRADEMARK OFFICE
CERTIFICATE OF CORRECTION

PATENT NO. : 6,727,493 B2
DATED : April 27, 2004
INVENTOR(S) : Ruth E. Franklin et al.

It is certified that error appears in the above-identified patent and that said Letters Patent is hereby corrected as shown below:

Title page,
Item [73], Assignee, delete "Incoders," and substitute -- Encoders, -- in its place; and after "CA (US)" insert --; Austria Mikro Systeme International AG, Unterpremstaetten, Austria --.

Signed and Sealed this

First Day of November, 2005

JON W. DUDAS
*Director of the United States Patent and Trademark Office*